United States Patent Office 3,246,007
Patented Apr. 12, 1966

3,246,007
2-HALO-5-(1,3,4-OXADIAZOLIN-2-YL)-BENZENE-SULFONAMIDE COMPOUNDS
Robert F. Meyer, Ann Arbor, and Betty L. Cummings, Dearborn, Mich., assignors to Parke, Davis & Company, Detroit, Mich., a corporation of Michigan
No Drawing. Filed Dec. 13, 1963, Ser. No. 330,267
6 Claims. (Cl. 260—307)

The present invention relates to new 1,3,4-oxidiazole compounds and to methods for their production. More particularly, it relates to new 1,3,4-oxadiazole compounds of the formula

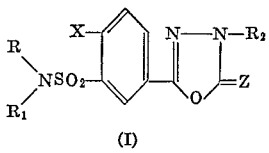

(I)

to non-toxic acid-addition salts thereof and to alkali metal salts thereof; where R and $R_1$ are each hydrogen or lower alkyl; $R_2$ is hydrogen, lower alkyl, or di-lower alkylaminoalkyl; X is chlorine or bromine; and Z is oxygen or sulfur.

In accordance with the invention, 1,3,4-oxadiazole compounds of the formula

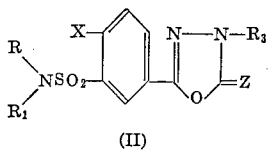

(II)

are produced by the reaction of a $N^2,N^2$-dialkylbenzhydrazide having the formula

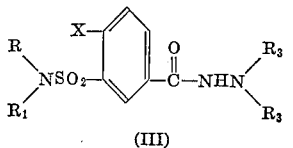

(III)

with a carbonyl halide, such as phosgene, or with thiophosgene; where $R_3$ is hydrogen or lower alkyl and R, $R_1$, X and Z have the aforementioned significance. The reaction may be carried out in a variety of solvents, including aromatic hydrocarbons, such as benzene, toluene, and xylene; halogenated alkanes, such as ethylene chloride and propylene chloride; and ethers, such as dioxane, tetrahydrofuran, and 1,2-dimethoxyethane. A preferred solvent is dioxane. The temperature and duration of the reaction are not critical and may be varied over a wide range; a temperature in the range of 50–150° C. and a duration of 1–12 hours may be employed. Preferred conditions are a temperature in the range of 60–90° C. for a period of 1–4 hours. At least one molar equivalent, and preferably an excess, of carbonyl halide or thiophosgene is employed.

Also in accordance with the invention, 1,3,4-oxadiazole compounds of the formula

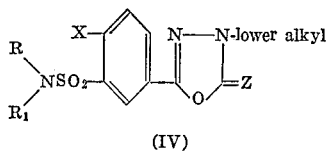

(IV)

are produced by the reaction of a 2-(4-halophenyl)-1,3,4-oxadiazole compound having the formula

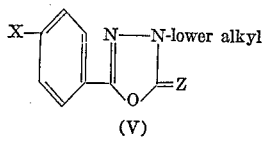

(V)

with chlorosulfonic acid, followed by reaction of the intermediate 5-(1,3,4-oxadiazolin-2-yl)-benzenesulfonyl chloride having the formula

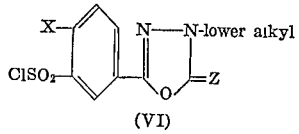

(VI)

with an amine having the formula

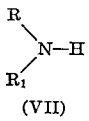

(VII)

where R, $R_1$, X, and Z are as defined previously. The first stage of this process, the formation of the 5-(1,3,4-oxadiazolin-2-yl)-benzenesulfonyl chloride of Formula VI, is normally carried out in an excess of chlorosulfonic acid in the absence of any other solvent. At least two molar equivalents of chlorosulfonic acid are employed, but an excess is preferred. A wide range of temperature may be employed for this first stage; it is preferable, however, to carry out the reaction at the reflux temperature. The duration of the reaction is not critical; a period of 1 to 5 hours is normally employed. The second stage of this process, the production of the 1,3,4-oxadiazole compounds of Formula IV, is carried out in a solvent in the presence of at least two molar equivalents, and preferably an excess, of the amine of Formula VII. Suitable solvents are water, lower alkanols, aliphatic and aromatic hydrocarbons, such as hexane, benzene, and toluene, and ethers, such as diethyl ether, dioxane, and tetrahydrofuran. It is preferable and most convenient to supply the amine to the reaction in aqueous or alcoholic solution. This second stage is preferably carried out at a temperature below 30° C. for a period that may be varied from 30 minutes to 18 hours.

The 2-(4-halophenyl)-1,3,4-oxadiazole compounds of Formula V, used as starting materials in the foregoing process, can be prepared by the reaction of a 4-halobenzoyl chloride with an unsymmetrical dialkylhydrazine, followed by reaction of the intermediate 4-halo-$N^2,N^2$-dialkylbenzhydrazide with excess carbonyl halide or thiophosgene.

Further in accordance with the invention, 1,3,4-oxadiazole compounds of the formula

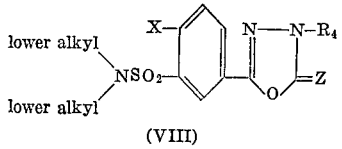

(VIII)

are produced by the reaction of a 1,3,4-oxadiazole compound having the formula

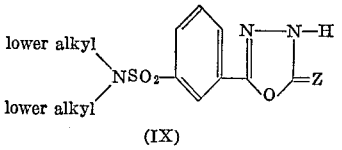

(IX)

with an alkylating agent having the formula

$$R_4—X$$
$$(X)$$

in the presence of a base; where $R_4$ is lower alkyl or di-lower alkyl-aminoalkyl, and X and Z have the aforementioned significance. Suitable bases which may be used include sodium, potassium, and lithium metals; sodium, potassium, and lithium amides; and sodium and lithium hydrides. A preferred base is sodium hydride. Substantially equivalent quantities of reactants may be employed; it is preferable, however, to use a small excess of base and alkylating agent. A wide variety of solvents may be employed, including aromatic hydrocarbons, such as toluene and xylene; ethers, such as diethylene glycol, dimethyl ether, and dibutyl ether; higher-boiling aliphatic hydrocarbons, such as isooctane; petroleum fractions of boiling-point higher than 100° C.; mineral oil; and N,N-dimethylformamide. Combinations of these may also be used. A preferred solvent is N,N-dimethylformamide. The temperature and duration of the reaction are not critical, and may be varied from 25° to 150° C. for a period of 30 minutes to 48 hours. Preferred conditions are a temperature in the range of 25° to 100° C. for a period of 18 to 22 hours.

The free base compounds of the invention, which are those of Formula I wherein $R_2$ is di-lower alkyl-aminoalkyl, form non-toxic acid-addition salts by reaction with a variety of inorganic and organic acids. Non-toxic acid-addition salts are formed by reaction of the free base with acids such as hydrochloric, sulfuric, nitric, phosphoric, acetic, benzoic, citric, tartaric, sulfamic, and the like.

The free acid compounds of the invention, which are those of Formula I wherein R is hydrogen or lower alkyl, $R_1$ is hydrogen, and $R_2$ is hydrogen or lower alkyl, form alkali metal salts upon treatment with strong alkali metal bases, such as sodium hydroxide and potassium hydroxide. Such salts are equivalent to the parent compounds for purposes of the invention.

The new compounds of the invention are useful pharmacological agents. They are diuretic agents that produce a marked increase in cation and chloride ion excretion, as well as in urine volume. They are active upon oral administration.

The invention is illustrated by the following examples:

Example 1

A stirred solution of 20 g. of 4-chloro-3-sulfamoyl-$N^2,N^2$-dimethylbenzhydrazide in 1000 ml. of dioxane, heated to 70–80° C., is treated with an excess of phosgene vapor, and heating and stirring are continued for one hour more. The resulting solution is evaporated to dryness under reduced pressure, and the solid 2-chloro-5-(4-methyl - 5 - oxo-$\Delta^2$-1,3,4-oxadiazolin-2-yl)-benzenesulfonamide obtained is crystallized from isopropanol; M.P. 232–233° C.

In a similar manner, by the substitution of 20 g. of 4 - bromo - 3-sulfamoyl-$N^2,N^2$-dimethylenzhydrazide, for the 4 - chloro-3-sulfamoyl-$N^2,N^2$-dimethylbenzhydrazide, there is obtained 2-bromo-5-(4-methyl-5-oxo-$\Delta^2$-1,3,4-oxadiazolin-2-yl-)-benzenesulfonamide; and by the substitution of 20 g. of 4-chloro-3-sulfamoyl-$N^2,N^2$-diethylbenzhydrazide for the 4-chloro-3-sulfamoyl-$N^2,N^2$-dimethylbenzhydrazide there is obtained 2-chloro-5-(4-ethyl - 5 - oxo - $\Delta^2$-1,3,4-oxadiazolin-2-yl)-benzenesulfonamide.

The sodium salt of 2-chloro-5-(4-methyl-5-oxo-$\Delta^2$-1,3,4-oxadiazolin-2-yl)-benzenesulfonamide is obtained by dissolving 2.9 g. of the sulfonamide together with 0.4 g. of sodium hydroxide in 50 ml. of water at room temperature, evaporating the solution to dryness under reduced pressure at or below room temperature, and isolating and drying the solid salt.

Example 2

A solution of 60 g. of 4-chloro-3-(N,N-dimethylsulfamoyl)-benzhydrazide in 300 ml. of dioxane, kept at 75–80° C., is treated with an excess of phosgene, and then evaporated to dryness under reduced pressure. The residue is dissolved in dilute aqueous ammonia, and the solution is acidified with dilute hydrochloric acid to give 2 - chloro - 5 - (5-oxo-$\Delta^2$-1,3,4-oxadiazolin-2-yl)-N,N-dimethylbenzenesulfonamide, M.P. 194–195° C. after crystallization from ethanol. This product exists in equilibrium with the enolform, 2-chloro-5-(5-hydroxy-1,3,4-oxadiazol-2-yl)-N,N-dimethylbenzenesulfonamide.

Example 3

To a solution of 25 g. of thiophosgene in 100 ml. of dioxane is added 10 g. of 4-chloro-3-sulfamoyl-$N^2,N^2$-dimethylbenzhydrazide, and the resulting mixture is stirred and heated at 80° C. for one hour. The solution is evaporated to dryness under reduced pressure, and the solid residue of 2-chloro-5-(4-methyl-5-thioxo-$\Delta^2$-1,3,4-oxadiazolin-2-yl)-benzenesulfonamide obtained is crystallized from isopropanol; M.P. 214–215° C.

Example 4

A mixture of 40 g. of 2-(p-chlorophenyl)-4-methyl-$\Delta^2$-1,3,4-oxadiazolin-5-one and 200 ml. of chlorosulfonic acid is heated under reflux for 3 hours. After cooling, the mixture is diluted with 1000 ml. of iced water, and the precipitated solid is isolated, washed several times with iced water, and dried. This intermediate 2-chloro-5 - (4-methyl-5-oxo-$\Delta^2$-1,3,4-oxadiazolin-2-yl)-benzensulfonyl chloride is then added in portions, with stirring, to 100 ml. of 40% aqueous methylamine kept at a temperature below 0° C. The resulting mixture is allowed to stand at room temperature for 16 hours, and the solid 2-chloro-5-(4-methyl-5-oxo-$\Delta^2$-1,3,4-oxadiazolin-2-yl)-N-methylbenzenesulfonamide that precipitates is isolated by filtration, washed with water and crystallized from 95% ethanol; M.P. 231–233° C. An additional amount of this product is obtained by acidifying the filtrate with hydrochloric acid, isolating the precipitated solid, and crystallizing from 95% ethanol.

In the foregoing procedure, by the substitution of 145 ml. of 40% aqueous ethylamine for the aqueous methylamine there is obtained 2-chloro-5-(4-methyl-5-oxo-$\Delta^2$-1,3,4-oxadiazolin-2-yl)-N-ethylbenzenesulfonamide.

The 2-(p-chlorophenyl)-4-methyl-$\Delta^2$-1,3,4-oxadiazolin-5-one used as starting material can be obtained according to the following procedure. 4-chlorobenzoyl chloride (158 g.) is added dropwise, with stirring, to a solution of 110 g. of unsymmetrical dimethylhydrazine in 1500 ml. of tetrahydrofuran kept at a temperature below 40° C. After standing for 3 hours, the mixture is filtered to remove unsymmetrical dimethylhydrazine hydrochloride, and the filtrate is evaporated to dryness under reduced pressure. The solid 4 - chloro - $N^2,N^2$ - dimethylbenzhydrazide obtained is crystallized from aqueous acetonitrile; M.P. 135–137° C. The 4-chloro-$N^2,N^2$-dimethylhydrazide (356 g.) is dissolved in 2500 ml. of dioxane, and the solution, kept at 75–80° C., is treated with excess phosgene, and heated at 75–80° C. for 3 hours more. The resulting solution is evaporated to dryness under reduced pressure to give the desired 2-(p-chlorophenyl)-4-methyl-$\Delta^2$-1,3,4-oxadiazolin-5-one, M.P. 151–152° C., after crystallization from isopropanol.

Example 5

A mixture of 40 g. of 2-(p-chlorophenyl)-4-methyl-$\Delta^2$-1,3,4-oxadiazolin-5-one and 200 ml. of chlorosulfonic acid is heated under reflux for 3 hours. After cooling, the mixture is diluted with 1000 ml. of iced water, and the precipitated solid is isolated, washed several times with iced water, and dried. This intermediate 2-chloro-5 - (4 - methyl-5-oxo-$\Delta^2$-1,3,4-oxadiazolin-2-yl)-benzenesulfonyl chloride is then added in portions, with stirring, to 100 ml. of anhydrous dimethylamine kept at a temperature below −5° C. Excess dimethylamine is allowed to evaporate at room temperature, the residue is suspended in 50 ml. of water and the mixture is neutralized with acetic acid. The solid 2-chloro-5-(4-methyl-5-oxo-$\Delta^2$-1,3,4-oxadiazolin-2yl)-N,N-dimethylbenzenesulfonamide obtained is isolated, washed with water and crystallized from 95% ethanol; M.P. 160–161° C.

*Example 6*

To a solution of 14 g. of 2-chloro-5-(5-oxo-$\Delta^2$-1,3,4-oxadiazolin-2-yl)-N,N-dimethylbenzenesulfonamide, prepared as described in Example 2 above, in 100 ml. of N,N-dimethylformamide is added 4.3 g. of 53.8% sodium hydride in mineral oil, and the mixture is stirred and heated at 50° C. for 3 hours. After cooling, 7.0 g. of β-diethylaminoethyl chloride is added with stirring and cooling, and the mixture is stirred for 16 hours at room temperature, and for 3 hours at 100° C. The mixture is evaporated to dryness under reduced pressure, and the residue is extracted with benzene. The benzene solution is washed with water, dried over anhydrous potassium carbonate, and treated with dry hydrogen chloride. The solid 2-chloro-5-[4-(β-diethylaminoethyl)-5-oxo-$\Delta^2$-1,3,4-oxadiazolin-2-yl]N,N-dimethylbenzenesulfonamide hydrochloride that precipitates is isolated and crystallized from isopropanol; M.P. 204–205° C.

By the substitution of 6.3 g. of γ-dimethylaminopropyl chloride for the β-diethylaminoethyl chloride in the foregoing procedure, there is obtained 2-chloro-5-[4-(γ-dimethylaminopropyl)-5-oxo-$\Delta^2$-1,3,4-oxadiazolin-2-yl]-N,N-dimethylbenzenesulfonamide hydrochloride.

We claim:

1. A member of the class consisting of 1,3,4-oxadiazole compounds of the formula

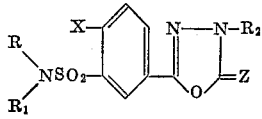

non-toxic acid-addition salts of the free base compounds of the foregoing formula, and non-toxic alkali metal salts of the free acid compounds of the foregoing formula; where R and $R_1$ are each members of the class consisting of hydrogen and lower alkyl, $R_2$ is a member of the class consisting of hydrogen, lower alkyl, and di-lower alkyl-aminoalkyl, X is a member of the class consisting of chlorine and bromine, and Z is a member of the class consisting of oxygen and sulfur.

2. 2-chloro-5-(4-methyl-5-oxo-$\Delta^2$-1,3,4-oxadiazolin-2-yl)-N-methylbenzenesulfonamide.

3. 2-chloro-5-(4-methyl-5-oxo-$\Delta^2$-1,3,4-oxadiazolin-2-yl)-N,N-dimethylbenzenesulfonamide.

4. 2-chloro-5-(4-methyl-5-oxo-$\Delta^2$-1,3,4-oxadiazolin-2-yl)-benzenesulfonamide.

5. 2-chloro-5-(4-methyl-5-thioxo-$\Delta^2$-1,3,4-oxadiazolin-2-yl)-benzenesulfonamide.

6. 2-chloro-5-[4-(β-diethylaminoethyl)-5-oxo-$\Delta^2$-1,3,4-oxadiazolin-2-yl]-N,N-dimethylbenzenesulfonamide hydrochloride.

References Cited by the Examiner

UNITED STATES PATENTS 3,127,410   3/1964   Smith _____ 260—307

FOREIGN PATENTS 890,461   2/1962   Great Britain.

OTHER REFERENCES

Cram et al., Organic Chemistry, New York, McGraw-Hill, 1959, pages 214, 367, 491.

HENRY R. JILES, *Acting Primary Examiner.*

R. J. GALLAGHER, *Assistant Examiner.*